United States Patent
Shiga

(10) Patent No.: US 11,516,369 B2
(45) Date of Patent: Nov. 29, 2022

(54) IMAGE FORMING APPARATUS CONTROLLING DENSITY OF OUTPUT IMAGE TO PERFORM CALIBRATION BASED ON A RESULT OF READING A TEST IMAGE

(71) Applicant: CANON KABUSHIKI KAISHA, Tokyo (JP)

(72) Inventor: Tsuyoshi Shiga, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/153,653

(22) Filed: Jan. 20, 2021

(65) Prior Publication Data
US 2022/0038603 A1   Feb. 3, 2022

(30) Foreign Application Priority Data
Jul. 30, 2020   (JP) ............................. JP2020-129569

(51) Int. Cl.
*H04N 1/32*    (2006.01)
*H04N 1/52*    (2006.01)
*H04N 1/00*    (2006.01)
*H04N 1/407*   (2006.01)

(52) U.S. Cl.
CPC ....... *H04N 1/3263* (2013.01); *H04N 1/00087* (2013.01); *H04N 1/00795* (2013.01); *H04N 1/4078* (2013.01); *H04N 1/52* (2013.01); *H04N 2201/0082* (2013.01)

(58) Field of Classification Search
None
See application file for complete search history.

(56) References Cited

U.S. PATENT DOCUMENTS

| 6,418,281 | B1 | 7/2002 | Ohki |
| 6,775,029 | B1* | 8/2004 | Wen ................... H04N 1/00002 358/1.9 |
| 9,858,515 | B2* | 1/2018 | Kurohata ............... G03G 15/70 |
| 10,719,412 | B2* | 7/2020 | Michishita ............. G06F 8/63 |
| 2004/0081477 | A1* | 4/2004 | Maebashi .......... G03G 15/5058 399/49 |
| 2009/0296116 | A1* | 12/2009 | Asai ................... H04N 1/00063 358/1.9 |
| 2016/0286093 | A1* | 9/2016 | Negishi .............. G03G 15/5058 |

\* cited by examiner

*Primary Examiner* — Barbara D Reinier
(74) *Attorney, Agent, or Firm* — Canon U.S.A., Inc. IP Division

(57) ABSTRACT

An image forming apparatus includes a conversion unit configured to convert image data based on a conversion condition, an image forming unit configured to form an image on a sheet based on the converted image data, a detection unit configured to detect a pattern image on a transfer member, a reading unit configured to read a test image formed on a sheet, a controller configured to perform calibration based on a reading result of the reading unit, and a reception unit. In a case where the calibration is performed, the controller determines an image forming condition based on a result of detection by the detection unit before the test image is formed. In a case where the reception unit receives the discontinuation instruction, the controller changes the image forming condition to an image forming condition before the pattern image is formed.

9 Claims, 12 Drawing Sheets

SELECT TEST CHART READING METHOD.

[ ADF ] ~701a

[ PLATEN ] ~701b

PLACE TEST CHART ON ADF.

ADJUST REGULATION MEMBER AFTER TEST CHART IS PLACED.

[ READING START ] ~701c

PLACE TEST CHART ON PLATEN.

SET TEST CHART BASED ON DOCUMENT ALIGNMENT MARK.

[ READING START ] ~701c

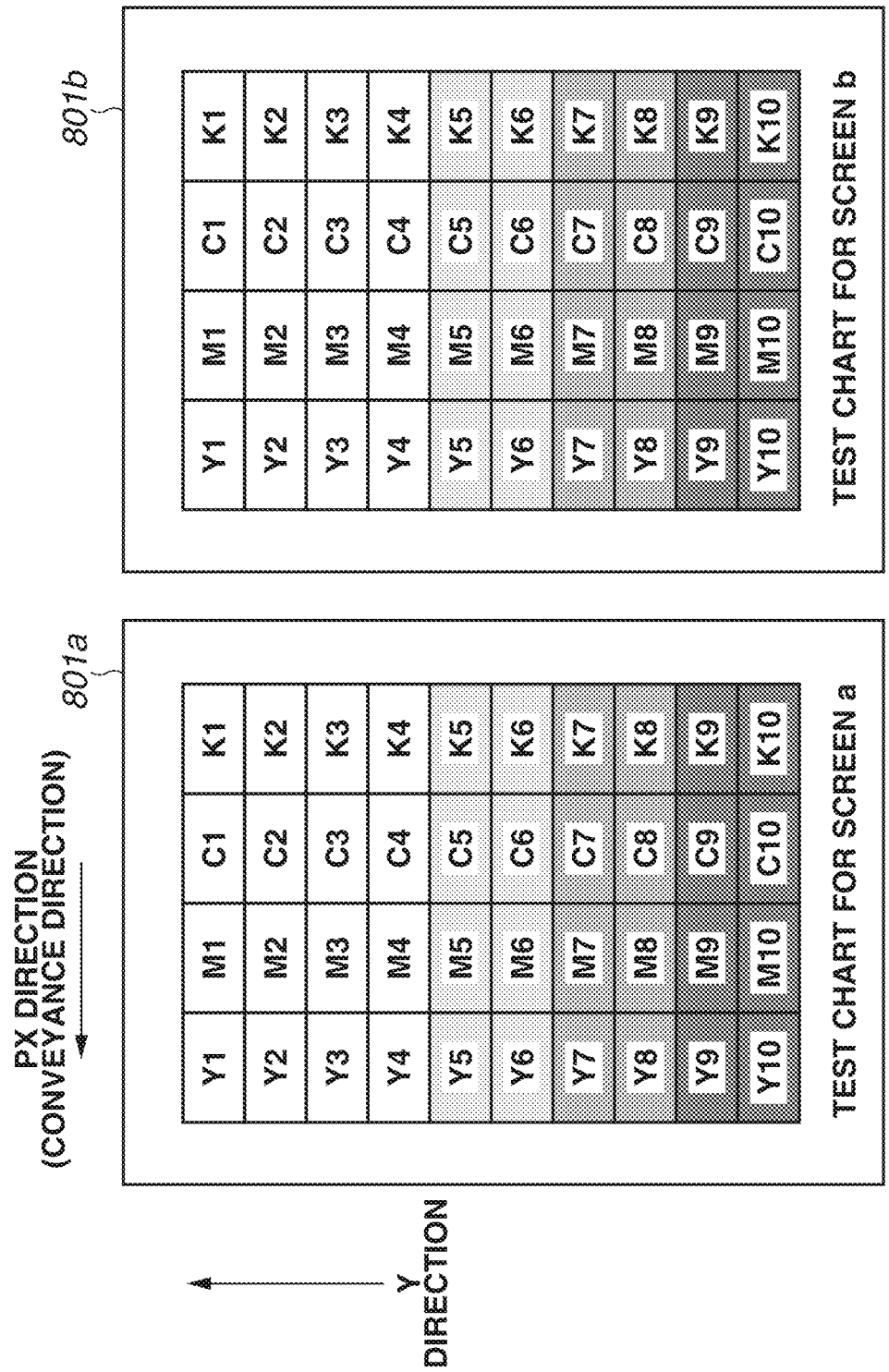

FIG.10A

|  | SCREEN A | SCREEN B | SCREEN C |
|---|---|---|---|
| LUT | NEW | NEW | NEW |
| VD/LPW | NEW | NEW | NEW |

FIG.10B

|  | SCREEN A | SCREEN B | SCREEN C |
|---|---|---|---|
| LUT | NEW | OLD | OLD |
| VD/LPW | NEW | OLD | OLD |

FIG.10C

|  | SCREEN A | SCREEN B | SCREEN C |
|---|---|---|---|
| LUT | NEW | NEW | OLD |
| VD/LPW | NEW | NEW | OLD |

FIG.11

- CHECK PRESENCE OF TWO OR MORE SHEETS IN CASSETTE.
- TWO TEST CHARTS ARE SUCCESSIVELY CREATED.

PRINT START ~701d

- CHECK PRESENCE OF TWO OR MORE SHEETS IN CASSETTE. ~700f
- FIRST TEST CHART IS CREATED.

PRINT START ~701d

FIG.12B

PLACE FIRST TEST CHART ON PLATEN. ~700g

READING START ~701c

FIG.12C

- SECOND TEST CHART IS CREATED. ~700h

PRINT START ~701d

FIG.12D

PLACE SECOND TEST CHART ON PLATEN. ~700i

READING START ~701c

IMAGE FORMING APPARATUS CONTROLLING DENSITY OF OUTPUT IMAGE TO PERFORM CALIBRATION BASED ON A RESULT OF READING A TEST IMAGE

BACKGROUND OF THE DISCLOSURE

Field of the Disclosure

The aspect of the embodiments relates to density control to control density of an image formed by an image forming apparatus.

Description of the Related Art

It is known that density of an image formed by an image forming apparatus is varied due to an environmental condition (temperature and humidity), and wear of parts. A common image forming apparatus thus can form a test image and perform a calibration function of controlling density of an output image based on a result of reading the test image by a reading device.

As a method of controlling the density of an image formed by an image forming apparatus, a method of controlling an image forming condition and a method of controlling an image processing condition (conversion condition) are known.

As the image forming condition, for example, a charging voltage to be applied to a charging member charging a photosensitive body, laser power of a light source exposing the photosensitive body, and a development voltage to be applied to a developing sleeve developing an electrostatic latent image are known. An image forming apparatus can change the maximum density of an output image by change of the image forming condition. It is known that, on the other hand, controlling the image forming condition causes the low to halftone density of the output image to deviate from the ideal density.

The image processing condition (conversion condition) is, for example, a one-dimensional table or a function that represents relationship between an input value and an output value used to convert image data transferred to the image forming apparatus. The image forming apparatus can change the wide range from the low density to high density of the output image if the image processing condition (conversion condition) is changed. Even if the image processing condition (conversion condition) is controlled, however, there is an upper limit to a range where the maximum density is changeable.

Accordingly, a common image forming apparatus controls the density of the output image by changing both of the image forming condition and the image processing condition (conversion condition). An image forming apparatus discussed in U.S. Pat. No. 6,418,281 controls the image forming condition based on a reading result of a first test image, and then controls the image processing condition (conversion condition) based on a reading result of a second test image. The image forming apparatus forms the second test image based on the image forming condition determined based on the reading result of the first test image.

In an image forming apparatus, calibration may be cancelled in the middle of being executed. For example, a possible reason is that a sheet on which a test image has been formed may be jammed inside the image forming apparatus, and a user turns off the main power supply of the image forming apparatus. Another possible reason is that even though the calibration has been executed halfway through, a user instructs the image forming apparatus via an operation panel to cancel the calibration in the middle of being executed in a case where the user desires to execute printing in the image forming apparatus immediately.

In a case where the calibration is canceled in the middle of being executed, although the image forming condition has been updated, the image processing condition (conversion condition) may not be updated. In this case, since only the image forming condition is updated, the low to halftone density of the output image is deviated from the ideal density.

SUMMARY OF THE DISCLOSURE

According to an aspect of the embodiments, an image forming apparatus includes a conversion unit configured to convert image data based on a conversion condition, an image forming unit configured to form an image on a sheet based on the converted image data, a transfer member onto which a pattern image formed by the image forming unit is transferred, a detection unit configured to detect the pattern image formed on the intermediate transfer member, a reading unit configured to read a test image formed on a sheet, a controller configured to perform calibration, in which the conversion condition is generated based on a result of reading the test image by the reading unit, and a reception unit configured to receive an instruction to discontinue the calibration. In a case where the calibration is performed, the controller determines an image forming condition for controlling density of an image to be formed by the image forming unit based on a result of detection by the detection unit before the test image is formed. In a case where the reception unit receives the discontinuation instruction during a period from when the image forming condition is determined based on the detection result of the detection unit until the conversion condition is generated based on the result of reading the test image, the controller changes the image forming condition to an image forming condition before the pattern image is formed.

Further features of the disclosure will become apparent from the following description of exemplary embodiments with reference to the attached drawings.

BRIEF DESCRIPTION OF THE DRAWINGS

FIGS. 4A, 4B, and 4C are diagrams each illustrating an example of a user interface (UI) for the calibration.

FIG. 5 is a schematic view illustrating test charts.

FIGS. 10A, 10B, and 10C are tables each illustrating a combination of an image forming condition and a gradation correction condition.

FIG. 11 is an exemplary diagram illustrating a UI for calibration performed in automatic document feeder (ADF) reading.

FIGS. 12A to 12D are exemplary diagrams each illustrating a UI for calibration performed in platen reading.

DESCRIPTION OF THE EMBODIMENTS

Figure 1:
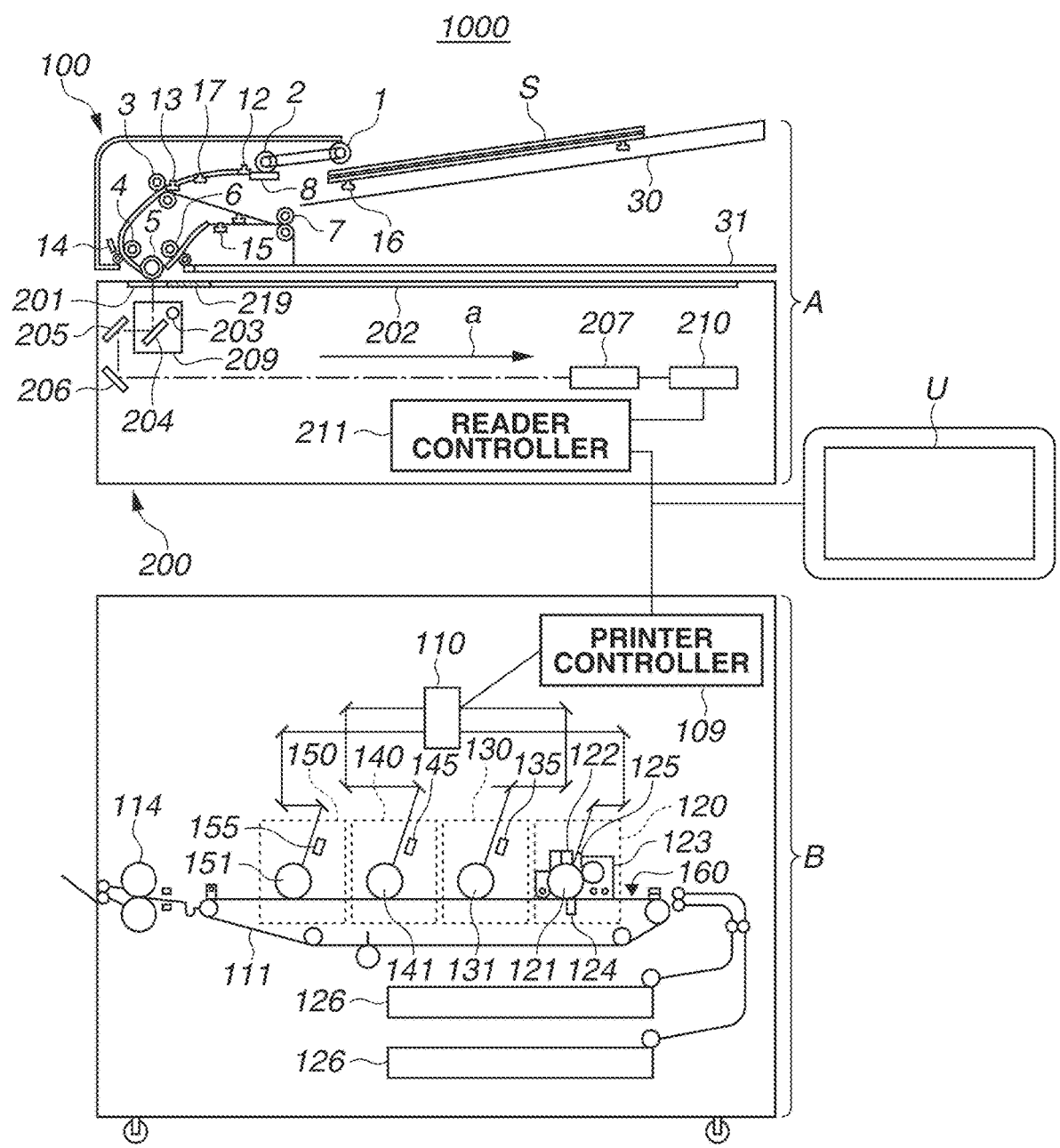
FIG. 1 is a schematic cross-sectional view of an image forming apparatus.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EROM). Examples of firmware may include microcode, writable control store, micro-programmed structure.

When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any non-transitory medium that may store information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

FIG. 1 is a cross-sectional view of an image forming apparatus 1000. The image forming apparatus 1000 includes a reader A and a printer B. The reader A includes an automatic document feeder (hereinafter, referred to as ADF) 100, an image reading unit 200, and a reader controller 211. The reader A can perform ADF reading to read a document conveyed by the ADF 100, and platen reading to read a document placed on a platen 202.

First, a configuration and operation of the ADF 100 will be described. When a document reading job by the ADF 100 is started, a carriage 209 moves to a position just below a white reference plate 219, and shading operation is performed. After the shading operation is performed, the carriage 209 moves to a position just below an ADF reading portion 201 of the platen 202, and stands by at the position. When the document reading job is started, a feeding roller 1 first falls on a document surface of a document bundle S including a plurality of sheets (documents), and starts to rotate. As a result, a document on the top of the document bundle is fed.

The ADF 100 includes a tray 30 that is a placement portion on which the document bundle S is placed. The ADF 100 feeds the documents one by one from the one on the top of the document bundle S placed on the tray 30. At this time, feeding of the documents is performed while a separation roller 2, a separation pad 8, and the feeding roller 1 prevent a document other than the one on the top from being overlapped thereon and being conveyed. In other words, the documents fed by the feeding roller 1 are separated one by one by action of the separation roller 2 and the separation pad 8. The feeding roller 1 conveys the separated document to a roller 3. After the document abuts on the roller 3, a loop is formed at the leading edge of the document, which eliminates skewing of a document.

A roller 4 is provided on a downstream side of the roller 3. A path to convey the document is provided from the roller 4 to the ADF reading portion 201. The document sent to the path is sent to the roller 4 by the roller 3. After passing the roller 4, the document is conveyed so as to pass through the ADF reading portion 201 near a platen roller 5.

When the document is conveyed to the ADF reading portion 201, a leading edge of the document is detected by a read sensor 14. The ADF 100 counts a time from a timing when the read sensor 14 is ON until a timing when the document reaches the ADF reading portion 201 by using a clock of a motor (not illustrated) that serves as a driving source of the roller 4 and the platen roller 5. As described above, in the case where the ADF reading is performed, the reader A starts to read the document at the timing when the leading edge of the document reaches the ADF reading portion 201.

When a trailing edge of the document is detected by a post-separation sensor 12, the ADF 100 detects presence or absence of a document on the tray 30 by a document detection sensor 16. When the document is further conveyed after the trailing edge of the document passes through the platen roller 5 and a roller 6, the trailing edge of the document is detected by a sheet discharge sensor 15. The document is discharged onto a document discharge tray 31 by a sheet discharge roller 7 at a timing when the trailing edge of the document is detected by the sheet discharge sensor 15. The document reading job (ADF reading) for reading one side of one sheet of document is ended.

As described above, in the case of the ADF reading, the ADF 100 conveys the documents placed on the tray 30 to the ADF reading portion 201 one by one. The image reading unit 200 moves the carriage 209 to the position just below the ADF reading portion 201, and reads the document at the position when the document is being conveyed. In contrast, in the case of the platen reading, the image reading unit 200 reads the document by the carriage 209 scanning the document placed on the platen 200 in an arrow a direction illustrated in FIG. 1.

As described above, the document placed on the ADF 100 or the document placed on the platen 202 is read by an optical system through the platen 202. The optical system includes reflecting mirrors 205 and 206, a lens 207, and a charge-coupled device (CCD) sensor 210 in addition to the carriage 209 including a light source lamp 203 and a reflecting mirror 204. Image information read by the CCD sensor 210 is photoelectrically converted into an electric signal data array, and the electric signal data array is further converted into an image signal by the reader controller 211. In the present exemplary embodiment, a carriage moving type reader in which the CCD sensor 210 does not move but the carriage 209 moves to read the document is described as the image reading unit 200. The present exemplary embodiment, however, is not limited to the configuration. The image reading unit 200 may be, for example, a sensor moving type reader in which a contact image sensor (CIS) reads the document while moving.

The white reference plate 219 is a white plate for creating reference data of a white level in shading correction processing Immediately after the document reading job is started, the image reading unit 200 moves the carriage 209 to the position just below the white reference plate 219, and reads the white reference plate 219 to perform the shading correction processing. An image signal on which the shading correction processing has been performed is output to a printer controller 109 of the printer B. At this time, the image signal includes respective pieces of luminance information on red (R), green (G), and blue (B).

The reader A can read a test chart placed on the platen 202 in place of the document. Further, the reader A can read the test chart placed on the tray 30 in place of the document while the test chart is being conveyed by the ADF 100.

In addition, a jam, i.e., conveyance failure of the document, may occur in the ADF 100. For example, the reader controller 211 determines whether conveyance failure of the document has occurred from each detection result and detection timing of the post-separation sensor 12, the read sensor 14, the sheet discharge sensor 15, and conveyance sensors 17 and 13. For example, in a case where the passing timing of the leading edge/trailing edge of the document is later than normal timing, or in a case where the leading edge/trailing edge of the document is not detected, it is determined that conveyance failure of the document has occurred.

Next, a configuration and operation of the printer B will be described. The printer B includes an image forming unit 120 forming a yellow image, an image forming unit 130 forming a magenta image, an image forming unit 140 forming a cyan image, and an image forming unit 150 forming a black image. Since each of the image forming units 120, 130, 140, and 150 has a similar configuration, the configuration of the yellow image forming unit 120 will be described here. The yellow image forming unit 120 includes a photosensitive drum 121, a charger 122, a developing device 123, and a transfer blade 124.

The photosensitive drum 121 is a drum including a photosensitive layer formed on a surface thereof. The photosensitive drum 121 is rotationally driven in a predetermined direction by a motor (not illustrated). The charger 122 is a corona charger including a wire and a grid electrode. The charger 122 may be a roller charger. A charging voltage is applied to the charger 122, and the charger 122 uniformly charges the photosensitive drum 121. When the charged photosensitive drum 121 is scanned with light radiated from a laser scanner, an electrostatic latent image is formed on the photosensitive drum 121. The developing device 123 includes a developing sleeve and an agitation member, and develops the electrostatic latent image formed on the photosensitive drum 121 by using toner.

The image signal input from the reader A is converted by the printer controller 109 into a pulse width modulation (PWM) signal. The PWM signal is a driving signal driving a laser beam radiated from the laser scanner 110. Further, in a case where image data is transferred from an external device, the printer controller 109 also converts an image signal of the image data into a PWM signal and drives a semiconductor laser 410 (FIG. 2) of the laser scanner 110.

A sheet stored in a cassette 126 is fed to a conveyance path and then conveyed to a transfer belt 111. The transfer belt 111 electrostatically attracts and conveys the sheet. The transfer blade 124 discharges from a rear surface of the transfer belt 111 and transfers a toner image on the photosensitive drum 121 onto the sheet being conveyed on the transfer belt 111. The sheet on which the toner images have been transferred from the photosensitive drums 121, 131, 141, and 151 is conveyed to a fixing device 114. The fixing device 114 melts the toner images on the sheet by heat from a heater to fix the toner images onto the sheet. The sheet to which the toner images have been fixed is discharged from the printer B.

The photosensitive drums 121, 131, 141, and 151 respectively include surface electrometers 125, 135, 145, and 155 each measuring a surface potential on the surface of the corresponding photosensitive drum. The surface electrometers 125, 135, 145, and 155 are used to adjust a contrast potential.

The image forming apparatus 1000 measures a pattern image that is formed on the transfer belt 111 by using a sensor 160 without being transferred onto the sheet. The sensor 160 is, for example, an optical sensor detecting reflected light from the pattern image formed on the transfer belt 111. The sensor 160 outputs an output value according to intensity of the reflected light. The output value of the sensor 160 is converted into density information based on a density conversion table previously stored. The density information is input to the printer controller 109. At this time, the transfer belt 111 functions as an intermediate transfer member to which the pattern image is transferred.

(Printer Controller)

Figure 2:
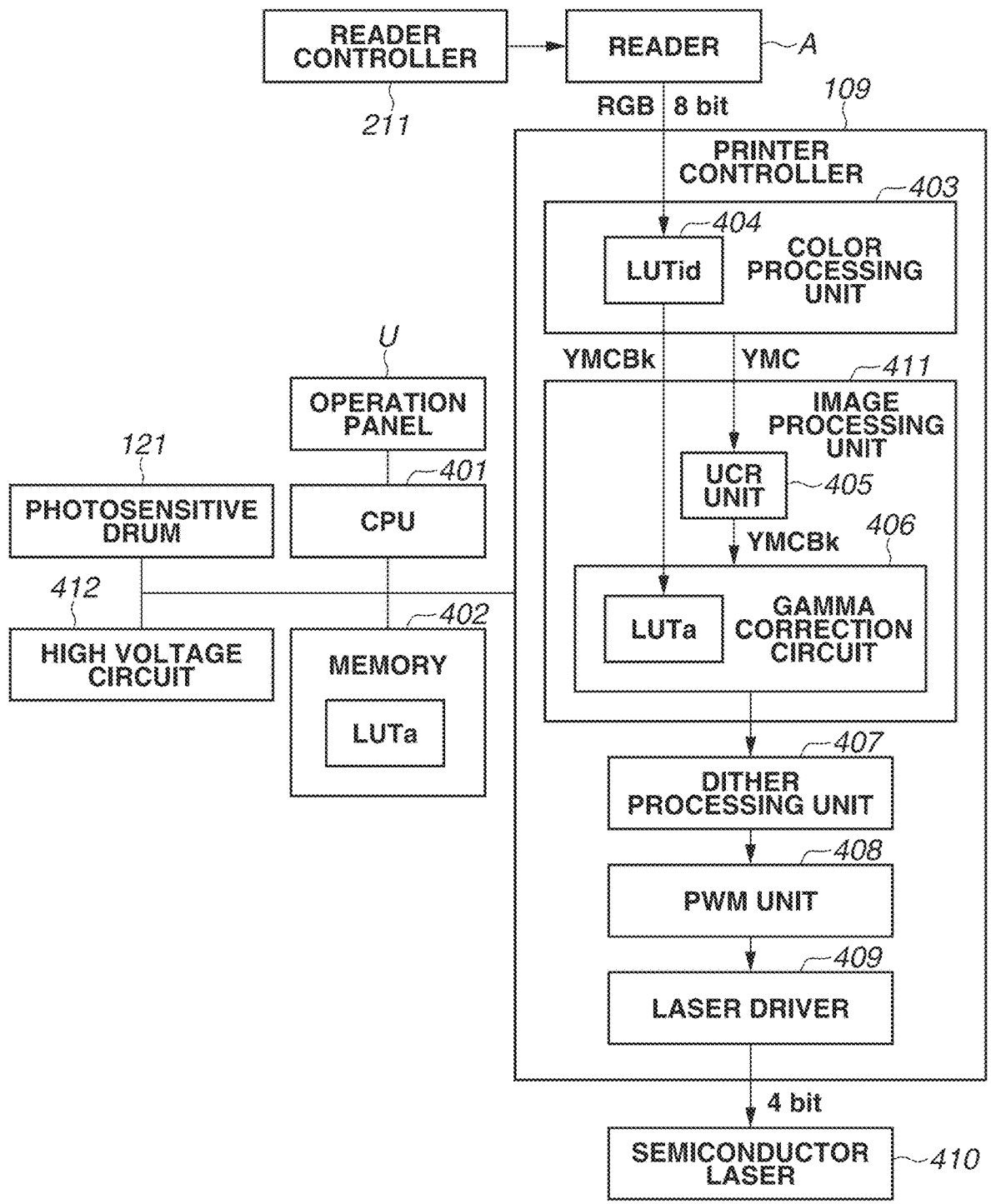
FIG. 2 is a control block diagram of the image forming apparatus.

FIG. 2 is a control block diagram of the image forming apparatus 1000. A central processing unit (CPU) 401 functions as a controller totally controlling units of the image forming apparatus 1000. A memory 402 includes a read only memory (ROM) and a random access memory (RAM), and stores a control program and various kinds of data. An operation panel U is a touch panel display in which a display and input keys are integrated.

The image signal output from the reader A is input to a color processing unit 403 of the printer controller 109. The color processing unit 403 performs color processing on the input image signal to obtain a desired output image in a case where the output characteristics of the printer B are ideal. The color processing unit 403 converts the input signal (luminance signal) of red (R), green (G), and blue (B) into an image signal (density signal) of yellow (Y), magenta (M), and cyan (C) by using an LUTid 404. The LUTid 404 is a conversion table to convert the luminance signal into the density signal. The image signal (density signal) of yellow (Y), magenta (M), and cyan (C) is output to an image processing unit 411.

The image processing unit 411 includes an under color removal (UCR) unit 405 and a gamma correction circuit 406. The UCR unit 405 performs under color removal processing for generating an image signal (density signal) of black (Bk) from the image signal (density signal) of yellow (Y), magenta (M), and cyan (C). The gamma correction circuit 406 converts the image signal to correct a density characteristic (gradation characteristic) of the printer B to an ideal density characteristic (ideal gradation characteristic). The image processing unit 411 converts the image signal by using a gradation correction condition (LUTa) corresponding to a type of a screen used in dither processing (halftone processing). The LUTa is a one-dimensional conversion table representing correspondence relationship between an input value and an output value of the image signal. As described above, the gradation characteristic of the image formed on the sheet by the printer B is varied depending on environmental change and wear of parts. Further, the gradation characteristic of the image is varied depending on a type of the screen. The CPU 401 thus performs calibration to update the LUTa, and maintains the gradation characteristic of the image at predetermined gradation characteristic. The printer B is an example of an image forming unit that forms a toner image on a sheet based on an image signal corrected by the gamma correction circuit 406. The memory 402 may hold a LUTa for each type of sheet. The CPU 401 reads out the LUTa corresponding to the type of the sheet designated via the operation panel U from the memory 402, and sets the LUTa to the gamma correction circuit 406. The LUTa is used when a document is copied and when an image is formed based on a print job from a host computer, but is not used when the calibration is performed.

The image signal output from the image processing unit 411 is input to a dither processing unit 407. The dither processing unit 407 performs the dither processing (halftone processing) on the output image signals determined based on the LUTa inside the gamma correction circuit 406, and outputs a resultant image signal to a PWM unit 408. The dither processing unit 407 performs the dither processing to convert the 10-bit image signal into 4-bit data. The PWM unit 408 generates a driving signal pulse-width modulated based on the image signal, and outputs the driving signal to a laser driver 409. The laser driver 409 causes the semiconductor laser 410 to emit light based on the driving signal.

A high voltage circuit 412 charges the surface of the photosensitive drum 121 to a predetermined potential, and controls high voltage application in the developing device 123 and the transfer blade 124.

(Calculation of Image Forming Condition)

The CPU 401 determines an image forming condition before updating the LUTa. In the following, for example, a surface potential (VD) of a charged area on the photosensitive drum 121 and intensity of the laser beam (LPW) emitted from the semiconductor laser 410 of the laser scanner 110 are determined as the image forming condition.

The CPU 401 forms pattern images with different densities on the transfer belt 111. The pattern images with the different densities are formed by change of the charging voltage and the laser power LPW. The CPU 401 causes the sensor 160 to measure reflected light from the pattern images with different densities, and calculates the surface potential VD and the laser power LPW from the densities of the pattern images and target densities. The CPU 401 controls the image forming apparatus 1000 based on the calculated image forming conditions.

(Calibration)

In the following, the calibration to generate the gradation correction condition by using the test chart will be described. The CPU 401 causes the image forming apparatus 1000 to form a test image on a sheet by supplying a predetermined image signal (density signal) to the dither processing unit 407. The sheet on which the test image has been formed is referred to as a test chart. The reader A reads the test chart, and the reader controller 211 transfers read data to the printer controller 109.

The printer controller 109 converts the read data of the test chart into density signal values. At this time, the printer controller 109 generates a density signal value of a yellow test image from a luminance signal value of blue (B) in the read data of the yellow test image. The printer controller 109 generates a density signal value of a magenta test image from a luminance signal value of green (G) in the read data of the magenta test image. The printer controller 109 generates a density signal value of a cyan test image from a luminance signal value of red (R) in the read data of the cyan test image. The printer controller 109 generates a density signal value of a black test image from a luminance signal value of green (G) in the read data of the black test image.

Next, the CPU 401 generates the LUTa such that the correspondence relationship (gradation characteristic) between the input value of the image signal used for formation of the test image and the density signal values acquired via the reader A becomes an ideal gradation characteristic. The LUTa is generated for each of the colors of yellow (Y), magenta (M), cyan (C), and black (Bk).

As described above, the reader A can perform both of the platen reading and the ADF reading. The reader A thus may perform the platen reading or the ADF reading on the test chart. In one embodiment, the ADF reading may be performed because the workload of an operator (user) is less in the ADF reading than in the platen reading.

Figure 3:
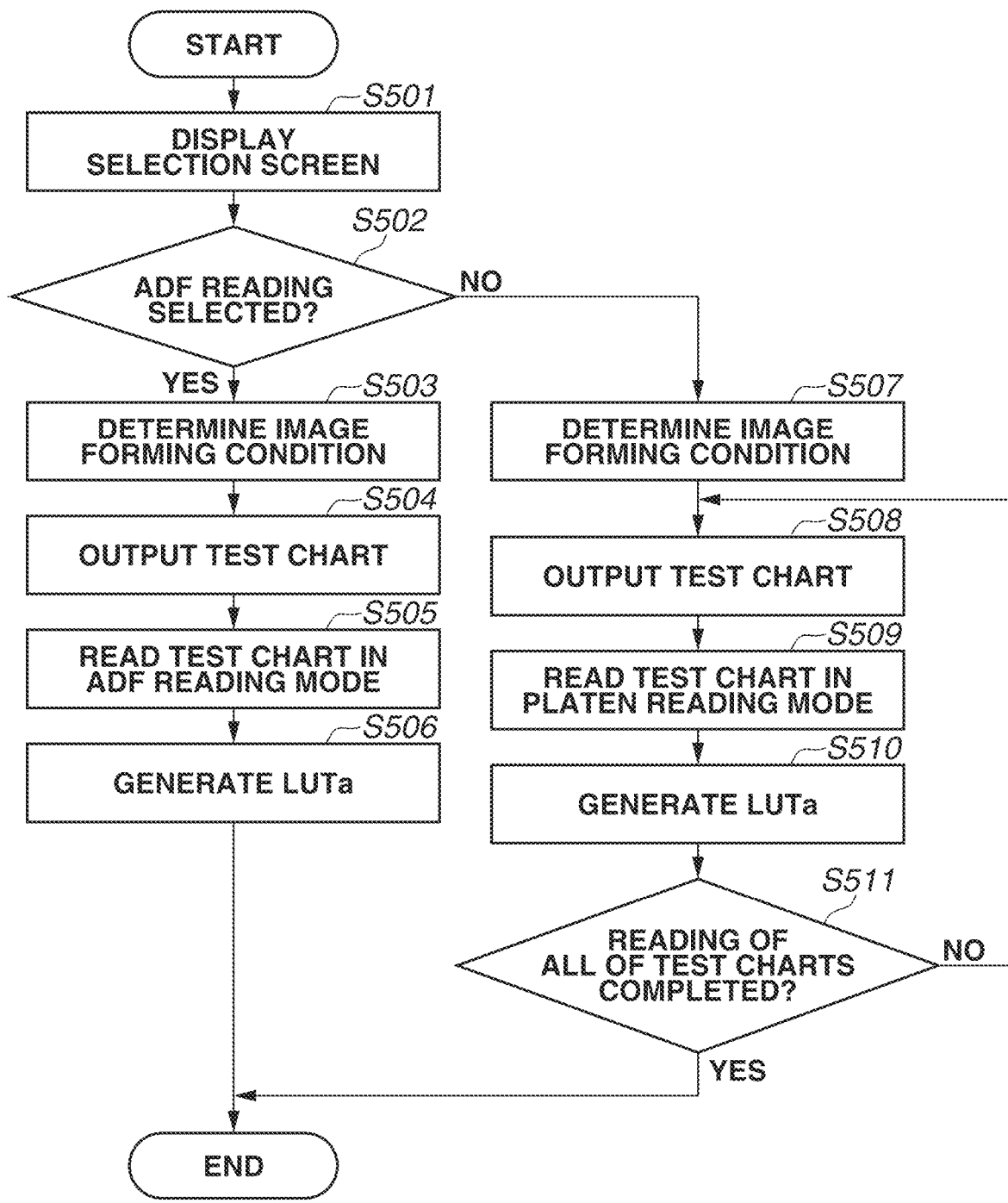
FIG. 3 is a flowchart illustrating calibration.

FIG. 3 is a flowchart illustrating calibration processing.

The calibration processing is performed, for example, when the CPU 401 reads out a program stored in the memory 402 in response to a calibration execution instruction from the operation panel U. In step S501, the CPU 401 displays a reading method selection screen on the operation panel U. When a user selects a reading method on the selection screen of the operation panel U, the CPU 401 acquires information about whether the reading method selected by the user is the ADF reading or the platen reading.

FIG. 4A illustrates the selection screen (UI 700a) displayed on the operation panel U. In step S501, the CPU 401 displays the selection screen (UI 700a) on the display of the operation panel. The UI 700a is the selection screen, which includes a button 701a for selecting the ADF reading and a button 701b for selecting the platen reading.

In step S502, the CPU 401 determines whether the user has selected the ADF reading based on the acquired information. In a case where the ADF reading has been selected in step S502 (YES in step S502), the processing proceeds to step S503, and the CPU 401 performs a first sequence. In contrast, in a case where the platen reading has been selected in step S502 (NO in step S502), the processing proceeds to step S507, and the CPU 401 performs a second sequence.
(First Sequence)

In step S503, the CPU 401 calculates the image forming condition from the detection result of the pattern image by the sensor 160. Here, VDn and LPWn are calculated as the image forming conditions. In step S504, the CPU 401 causes the printer B to form the test image on a sheet based on the test image data. In step S504, the image signal of the test image data is supplied to the dither processing unit 407, and the printer B discharges the sheet (test chart) on which the test image has been formed.

FIG. 5 illustrates examples of the test chart. Test charts 801a and 801b each include a test image including ten gradations for each of the colors Y, M, C, and Bk. For example, the ten gradations are respectively formed by image signals of 10%, 20%, 30%, 40%, 50%, 60%, 70%, 80%, 90%, and 100%. The dither processing unit 407 may perform a plurality of halftone processing. For example, the dither processing unit 407 may include a screen with low screen rulings (160 lpi to 180 lpi) and a screen with high screen rulings (250 lpi to 300 lpi). Here, "lpi" is an abbreviation for lines/inch. In a case where the LUTa for the plurality of halftone processes is generated, for example, an LUTa1 corresponding to the screen with low screen rulings and an LUTa2 corresponding to the screen with high screen rulings are generated.

The test chart 801a is a test chart to which the screen with low screen rulings has been applied. The test chart 801b is a test chart to which the screen with high screen rulings has been applied. The screen with low screen rulings is applied to a photographic image, etc., while the screen with high screen rulings is applied to characters, etc. The printer B may form an image with three or more types of screen rulings.

For example, the CPU 401 displays a UI 700d illustrated in FIG. 11 on the operation panel U. The UI 700d includes a message that prompts the user to check presence of two or more sheets in the cassette 126, a message indicating that two test charts are successively printed, and a button 701d for instructing start of printing. When start of printing is instructed, the CPU 401 sets the screen with low screen rulings to the dither processing unit 407, and outputs an image signal (test image signal) of the test image to the dither processing unit 407. The dither processing unit 407 performs the halftone processing on the test image signal based on the screen with low screen rulings. As a result, the 10-bit test image signal is converted into a 4-bit test image signal. The printer B prints the test chart 801a based on the test image signal output from the dither processing unit 407. Next, the CPU 401 sets the screen with high screen rulings to the dither processing unit 407, and outputs a test image signal to the dither processing unit 407. The dither processing unit 407 performs the halftone processing on the test image signal based on the screen with high screen rulings. As a result, the 10-bit test image signal is converted into a 4-bit test image signal. The printer B prints the test chart 801b based on the test image signal output from the dither processing unit 407.

When start of reading is instructed from the operation panel U after the user places the test charts 801a and 801b on the tray 30, in step S505, the CPU 401 operates the ADF 100 to perform the ADF reading. For example, when the test charts 801a and 801b are output in step S504, the CPU 401 displays a message that prompts the user to place the test charts on the tray 30 on the operation panel U. As illustrated in FIG. 4B, a UI 700b that includes the message and a button 701c for instructing start of reading is displayed on the operation panel U.

After the reader A reads the test charts 801a and 801b in the ADF reading in step S505, the reader controller 211 of the image reading unit 200 outputs read data to the printer controller 109. Thereafter, the processing proceeds to step S506.

In step S506, the CPU 401 generates the LUTa1 and the LUTa2 such that the gradation characteristics of the output images corresponding to the respective screens determined from the read data of the test charts 801a and 801b become the ideal gradation characteristics. Thereafter, the CPU 401 updates the image forming conditions with VDn and LPWn, also updates the LUTa1 and the LUTa2, and then ends the calibration processing.
(Second Sequence)

In step S507, the CPU 401 calculates the image forming condition from the detection result of the pattern image by the sensor 160. Here, the calculated image forming conditions are VDn and LPWn. In step S508, the CPU 401 causes the printer B to form the test image on a sheet based on the test image data. In step S508, the image signal of the test image data is supplied to the dither processing unit 407, and the test chart 801a is discharged.

For example, the CPU 401 displays a UI 700f illustrated in FIG. 12A on the operation panel U. The UI 700f includes a message that prompts the user to check presence of two or more sheets in the cassette 126, a message indicating that the first test chart 801a is printed, and the button 701d. When start of printing is instructed, the CPU 401 sets the screen with low screen rulings to the dither processing unit 407, and outputs an image signal of the test image (test image signal) to the dither processing unit 407. The dither processing unit 407 performs the halftone processing on the test image signal based on the screen with low screen rulings. As a result, the 10-bit test image signal is converted into a 4-bit test image signal. The printer B prints the test chart 801a based on the test image signal output from the dither processing unit 407.

In a case where start of reading is instructed from the operation panel U after the user places the test chart 801a on the platen 202, then in step S509, the CPU 401 performs the platen reading. For example, when the test chart is output in step S508, the CPU 401 displays a message that prompts the user to place the test chart on the platen 202 on the operation panel U. As illustrated in FIG. 4C, a UI 700c that includes the message and the button 701c for instructing start of reading is displayed on the operation panel U. The operator opens the ADF 100 so that the platen 202 is exposed, places the test chart on the platen 202, and then presses the reading start button 701c of the operation panel U. When the instruction to start of reading is input from the operation panel U, the CPU 401 causes the reader A to perform the platen reading. As a result, the reader controller 211 of the image reading unit 200 outputs read data to the printer controller 109. Thereafter, the processing proceeds to step S510.

For example, the CPU 401 displays a UI 700g illustrated in FIG. 12B on the operation panel U. The UI 700g includes a message that prompts the user to place the first test chart 801a on the platen 202, and the button 701c. The CPU 401 causes the image reading unit 200 to read the test chart 801a in response to pressing of the button 701c of the UI 700g.

The reader controller 211 outputs a luminance signal representing the reading result to the printer controller 109.

In step S510, the CPU 401 generates the LUTa1 such that the gradation characteristic of the output image corresponding to the screen with low screen rulings determined from the read data of the test chart 801a becomes the ideal gradation characteristic. Next, in step S511, the CPU 401 determines whether reading of all of the test charts has been completed. In a case where the test chart 801b for the screen with high screen rulings has not been read (NO in step S511), the processing returns to step S508, and the CPU 401 causes the printer B to output the test chart 801b.

For example, the CPU 401 displays a UI 700h illustrated in FIG. 12C on the operation panel U. The UI 700h includes a message indicating that the second test chart 801b is printed, and the button 701d. When start of printing is instructed, the CPU 401 sets the screen with high screen rulings to the dither processing unit 407, and outputs the test image signal to the dither processing unit 407. The dither processing unit 407 performs the halftone processing on the test image signal based on the screen with high screen rulings. As a result, the 10-bit test image signal is converted into a 4-bit test image signal. The printer B prints the test chart 801b based on the test image signal output from the dither processing unit 407.

For example, the CPU 401 displays a UI 700i illustrated in FIG. 12D on the operation panel U. The UI 700i includes a message that prompts the user to place the second test chart 801b on the platen 202, and the button 701c. The CPU 401 causes the image reading unit 200 to read the test chart 801b in response to pressing of the button 701c of the UI 700i. The reader controller 211 of the image reading unit 200 outputs a luminance signal indicating the reading result to the printer controller 109.

In contrast, in a case where reading of all of the test charts 801a and 801b has been completed in step S511 (YES in step S511), the CPU 401 updates the image forming conditions with VDn and LPWn, also updates the LUTa1 and the LUTa2, and then ends the calibration processing.

(Discontinuation of Calibration)

Figure 8:
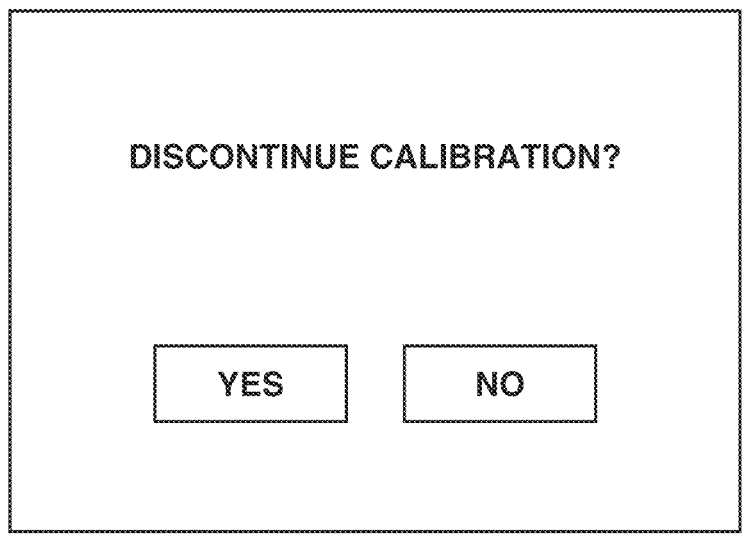
FIG. 8 is a diagram illustrating an example of a UI to instruct discontinuation of the calibration.

Discontinuation of the calibration will be described below. In the case where test charts are read in the ADF reading, a plurality of test charts is read at a time as described in FIG. 3. The plurality of test charts is thus output at a time. Before the output test charts are read in the ADF reading, the CPU 401 displays a UI illustrated in FIG. 8 on the operation panel U to check whether the user desires to discontinue formation of the test images. In a case where discontinuation of the calibration is instructed in the UI illustrated in FIG. 8 during the first sequence, an instruction to discontinue formation of the test images is input to the CPU 401. When the CPU 401 receives the discontinuation instruction, the CPU 401 discontinues the calibration. In the case where the calibration is discontinued, the CPU 401 returns the image forming condition to an original image forming condition before the pattern image is formed.

In a case where a jam occurs in the ADF 100 or in a case where the ADF 100 is turned off before reading of the test charts, the instruction to discontinue formation of the test images is also input to the CPU 401.

In contrast, in the case where the test charts are read in the platen reading, one test chart is output, and a test chart of other screen is not output until the output test chart is read. Therefore, the CPU 401 displays the UI illustrated in FIG. 8 on the operation panel U before each of the test charts is read to check whether the user desires to discontinue formation of the test images. In a case where discontinuation of the calibration is instructed via the UI illustrated in FIG. 8 during the second sequence, an instruction to discontinue formation of the test images is input to the CPU 401. Accordingly, the CPU 401 discontinues the calibration, and returns the image forming condition to an original image forming condition before the pattern image is formed.

In the case where the calibration is discontinued, a state where the image forming condition is changed but the gradation coefficient condition is not updated unless the image forming conditions (LPW and VD) are not returned to the image forming conditions before the discontinuation. As a result, the density of the output image cannot be controlled to the target density.

(Processing in Case of Discontinuation of Calibration)

Figure 6:
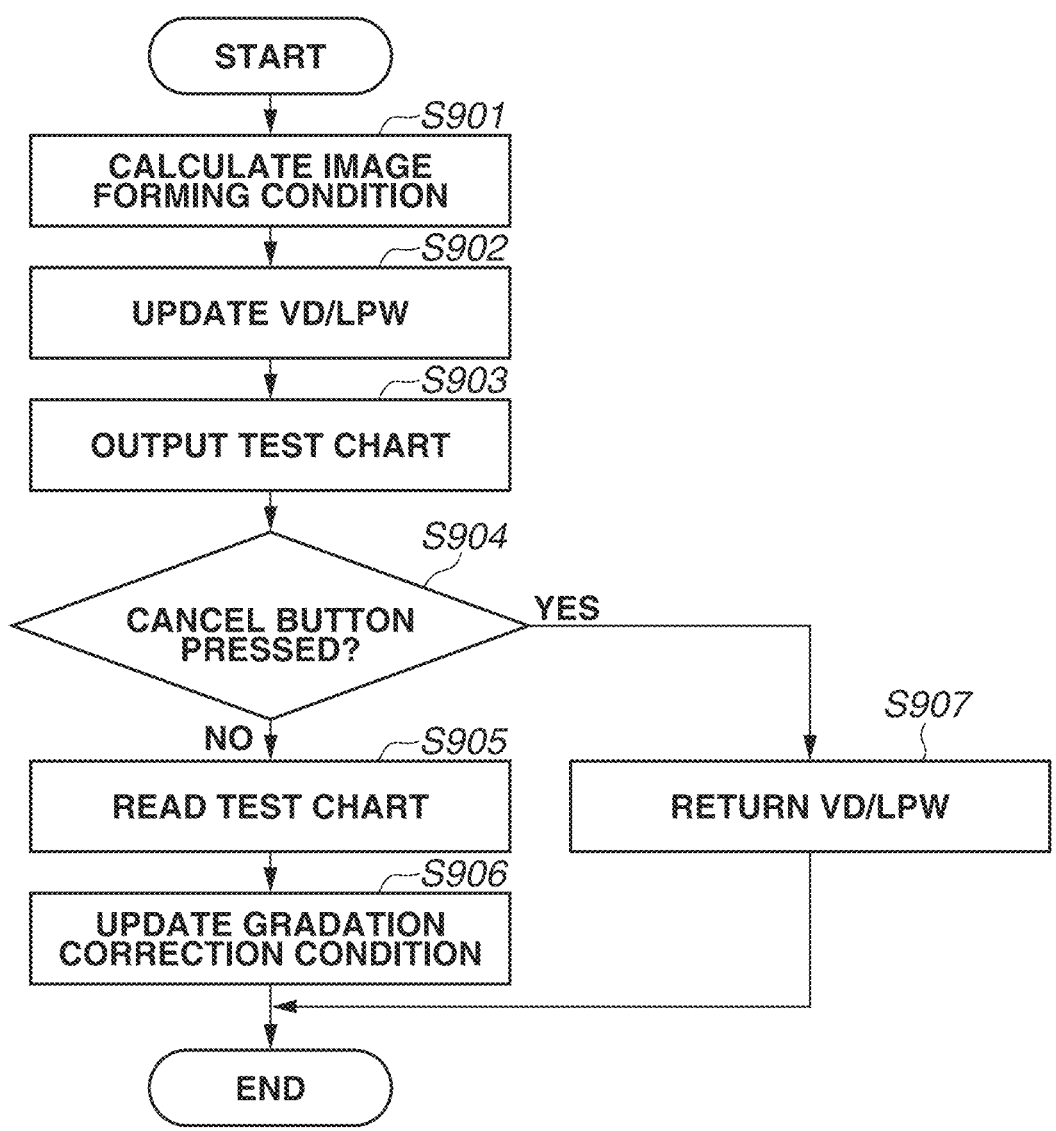
FIG. 6 is a flowchart illustrating a first sequence of the calibration.

In a case where the discontinuation instruction is received during a period from when the image forming conditions are determined based on the detection result of the sensor 160 until the gradation correction condition (LUTa) is generated, the CPU 401 changes the image forming conditions to the image forming conditions before the pattern image is formed. In the following, a case where the calibration is discontinued in the middle of the first sequence will be described with reference to a flowchart illustrating the first sequence in FIG. 6.

In step S901, the CPU 401 causes the printer B to form the pattern image, causes the sensor 160 to detect the pattern image on the transfer belt 111, and calculates the image forming conditions based on the detection result of the sensor 160. In step S902, the CPU 401 changes the image forming conditions to VDn and LPWn. The CPU 401 stores the image forming conditions (VDn and LPWn) calculated in step S901 and the image forming conditions (VDo and LPWo) used before the pattern image is formed in respectively different areas of the memory 402.

Next, in step S903, the CPU 401 causes the printer B to output the two test charts 801a and 801b (FIG. 5). Before the test charts 801a and 801b (FIG. 5) are printed, the CPU 401 displays the UI (FIG. 8) for the user to instruct discontinuation of the calibration on the display of the operation panel U. In step S904, the CPU 401 determines whether discontinuation of the calibration has been instructed before the test charts 801a and 801b are read. In response to selection of the discontinuation of the calibration by the user on the UI of FIG. 8, the operation panel U transmits the discontinuation instruction to the CPU 401.

In a case where the CPU 401 does not receive the discontinuation instruction and start of reading is instructed in step S904 (NO in step S904), the CPU 401 reads the test charts 801a and 801b in the ADF reading in step S905. In step S906, the CPU 401 generates the gradation correction conditions (LUTa1 and LUTa2), updates the gradation correction conditions (LUTa1 and LUTa2) stored in the memory 402, and ends the calibration processing.

In contrast, in a case where the CPU 401 receives the discontinuation instruction in step S904 (YES in step S904), then in step S907, the CPU 401 reads out the image forming conditions used before the pattern image is formed, from the memory 402, and resets the image forming conditions to the original values (VDo and LPWo). Thereafter, the CPU 401 ends the calibration processing.

How the discontinuation is instructed is not limited to the configuration in which the discontinuation instruction is transmitted in response to operation of the operation panel U by the user. For example, in a case where a jam occurs in the printer B while the printer B outputs the test chart 801a (or test chart 801b), the CPU 401 receives the discontinuation instruction. Further, for example, in a case where a jam occurs in the ADF 100 while the ADF 100 conveys the test chart 801a (or test chart 801b), the discontinuation instruction is also transmitted from the reader controller to the CPU 401. Further, for example, in a case where a main power supply of the image forming apparatus 1000 is turned off during a period from when the image forming conditions are determined based on the detection result of the sensor 160 until the gradation correction condition (LUTa) is generated based on the reading result of the test image, the CPU 401 receives the discontinuation instruction. In a case where the CPU 401 receives the discontinuation instruction during the first sequence, the CPU 401 resets the image forming conditions to the original values (VDo and LPWo), and ends the calibration processing.

Figure 7:
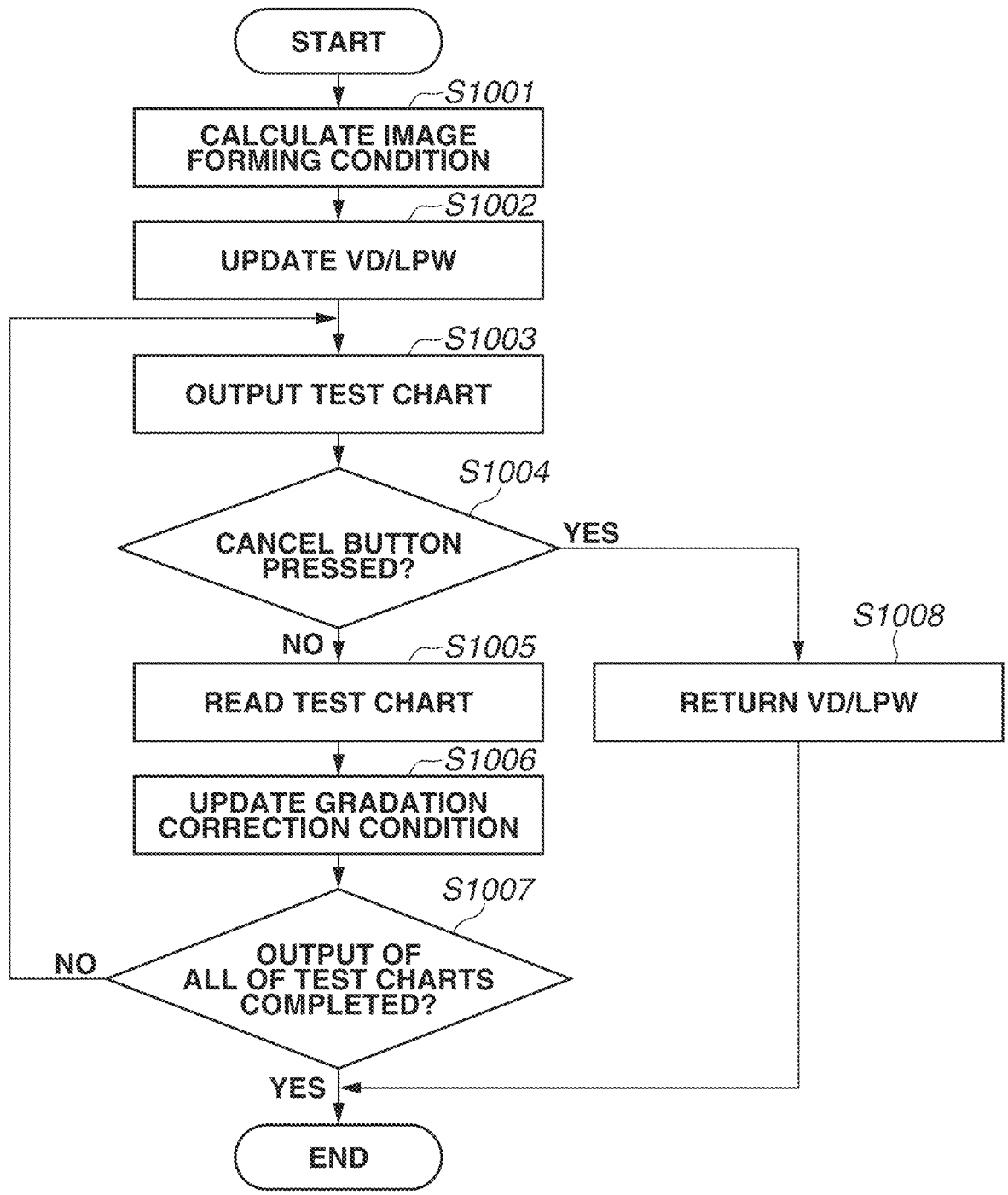
FIG. 7 is a flowchart illustrating a second sequence of the calibration.

Next, a case where the calibration is discontinued in the middle of the second sequence will be described with reference to a flowchart illustrating the second sequence in FIG. 7.

In step S1001, the CPU 401 causes the printer B to form a pattern image, causes the sensor 160 to detect the pattern image on the transfer belt 111, and calculates image forming conditions based on the detection result of the sensor 160. In step S1002, the CPU 401 changes the image forming conditions to VDn and LPWn. The CPU 401 stores the image forming conditions (VDn and LPWn) calculated in step S1001 and the image forming conditions (VDo and LPWo) used before the pattern image is formed in respectively different areas of the memory 402.

In the second sequence, the test charts for different screens are output one by one. First, in step S1003, the test chart 801a for the screen with low screen rulings is output. Before the test chart 801a is printed, the CPU 401 displays the UI (FIG. 8) for the user to instruct discontinuation of the calibration on the display of the operation panel U. In step S1004, the CPU 401 determines whether discontinuation of the calibration has been instructed before the test chart 801a is read. In response to selection of discontinuation of the calibration by the user via the UI of FIG. 8, the operation panel U transmits the discontinuation instruction to the CPU 401.

In a case where the CPU 401 does not receive the discontinuation instruction in step S1004 and start of reading is instructed (NO in step S1004), the processing proceeds to step S1005. In step S1005, the CPU 401 reads the test chart 801a in the platen reading. In step S1006, the CPU 401 generates the gradation correction condition (LUTa1) corresponding to the screen with low screen rulings, and updates the gradation correction condition (LUTa1) stored in the memory 402. Next, in step S1007, the CPU 401 determines whether reading of all of the test charts for the screens printed in the calibration has been completed.

In a case where reading of all of the test charts for the screens has not been completed in step S1007 (NO in step S1007), the processing returns to step S1003, and the CPU 401 causes the printer B to output the test chart 801b for the other screen (screen with high screen rulings). The CPU 401 similarly reads the test chart 801b in the platen reading, generates the gradation correction condition (LUTa2), and updates the gradation correction condition (LUTa2) stored in the memory 402.

After reading of the test charts for all of the screens is completed in step S1007 (YES in step S1007), the CPU 401 ends the calibration processing.

In contrast, in a case where the CPU 401 receives the discontinuation instruction in step S1004 (YES in step S1004), then in step S1008, the CPU 401 reads out the image forming conditions used before the pattern image is formed, from the memory 402, and resets the image forming conditions to the original values (VDo and LPWo). Thereafter, the CPU 401 ends the calibration processing.

How the discontinuation is instructed is not limited to the configuration in which the discontinuation instruction is transmitted in response to operation of the operation panel U by the user. For example, in the case where a jam occurs in the printer B while the printer B outputs the test chart 801a (or test chart 801b), the CPU 401 receives the discontinuation instruction. Further, for example, in the case where the main power supply of the image forming apparatus 1000 is turned off during the period from when the image forming conditions are determined based on the detection result of the sensor 160 until the gradation correction condition (LUTa) is generated based on the reading result of the test image, the CPU 401 receives the discontinuation instruction. In a case where the CPU 401 receives the discontinuation instruction during the second sequence, the CPU 401 resets the image forming conditions to the original values (VDo and LPWo), and ends the calibration processing.

Even in the case where the calibration is discontinued, the image forming apparatus 1000 sets the image forming conditions to the image forming conditions before the pattern image is formed. The image forming apparatus 1000 thus can perform image formation with an appropriate combination of image forming conditions and the gradation correction condition.

According to the exemplary embodiment of the disclosure, even in the case where the calibration is discontinued, it is possible to prevent the density of the output image from being erroneously adjusted.

Next, in a second exemplary embodiment, another case where the calibration is discontinued in the middle of the second sequence will be described with reference to a flowchart illustrating the second sequence in FIG. 9. In a case where the discontinuation instruction is received during a period from when the gradation correction condition (LUTa1) is generated until the gradation correction condition (LUTa2) is generated, the CPU 401 determines image forming conditions before the pattern image is formed, as the image forming conditions for the screen with high screen rulings.

Figure 9:
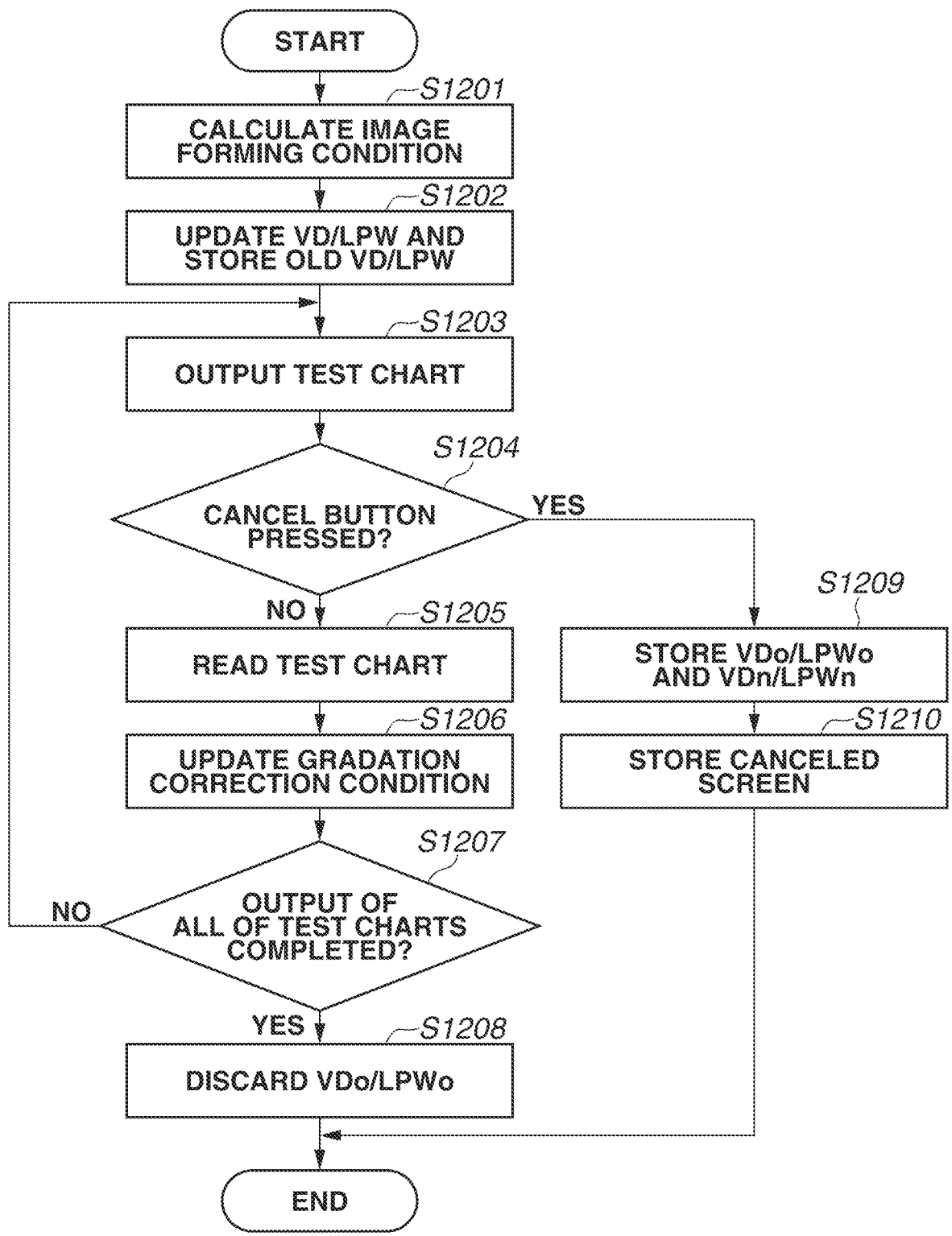
FIG. 9 is a flowchart illustrating calibration according to another exemplary embodiment.

In an example illustrated in FIG. 9, the test chart 801a and the test chart 801b are sequentially output. A test image for the screen with low screen rulings is formed in a first sheet, and a test image for the screen with high screen rulings is formed in a second sheet. Processing in steps S1201 to S1207 in FIG. 9 is similar to the processing in steps S1001 to S1007 in FIG. 7. Therefore, description of the processing in steps S1201 to S1207 will be omitted.

After reading of the test charts for all of the screens is completed in step S1207 (YES in step S1207), then in step S1208, the CPU 401 discards the image forming conditions (VDo and LPWo) before the pattern image stored in the memory 402 is formed. The CPU 401 then ends the calibration processing.

In a case where reading of the test charts for all of the screen is not completed in step S1207 (NO in step S1207), the processing returns to step S1203, and the CPU 401 causes the printer B to output the test chart 801b for the other screen (screen with high screen rulings). When the discontinuation instruction is not output, the CPU 401 similarly reads the test chart 801b in the platen reading, generates the gradation correction condition (LUTa2), and updates the gradation correction condition (LUTa2) stored in the memory 402.

In contrast, in a case where the discontinuation instruction is received in step S1204 (YES in step S1204), the processing proceeds to step S1209. A case where the CPU 401 receives the discontinuation instruction after the LUTa1 is generated and before the test chart 801*b* is read will be described below. In step S1209, the CPU 401 stores both of the image forming conditions (VDn and LPWn) calculated in step S1201 and the image forming conditions (VDo and LPWo) before the pattern image is formed, in the memory 402 without discarding the image forming conditions (VDo and LPWo). Thereafter, in step S1210, the CPU 401 stores the canceled screen. In this example, the CPU 401 stores the screen with the high screen rulings as the canceled screen. The CPU 401 then ends the calibration processing.

In a case where the image forming apparatus 1000 forms an image by using the screen with low screen rulings after the calibration is ended, the CPU 401 forms the image by using the image forming conditions (VDn and LPWn) and the gradation correction condition (LUTa1). In a case where the image forming apparatus 1000 forms the image by using the screen with high screen rulings after the calibration is ended, the CPU 401 forms the image by using the image forming conditions (VDo and LPWo) and the gradation correction condition (LUTa2). The gradation correction condition (LUTa2) corresponding to the screen with high screen rulings is not updated by the calibration.

FIGS. 10A to 10C are tables illustrating combinations of the image forming conditions (VD and LPW) and the gradation correction condition (LUT) determined by the CPU 401 through the calibration. In the case where the discontinuation is not instructed during the calibration, new image forming conditions (VDn and LPWn) and an updated gradation correction condition (LUTa) are applied to all of the screens as illustrated in FIG. 10A.

In the case where the test chart 801*a* is read but the test chart 801*b* is not read, image forming conditions and a gradation correction condition are used depending on the screen as illustrated in FIG. 10B. In the case where the image is formed by using the screen with low screen rulings, new image forming conditions (VDn and LPWn) and a new gradation correction condition (LUTa1) are used. In contrast, in the case where the image is formed by using the screen with high screen rulings, old image forming conditions (VDo and LPWo) and an old gradation correction condition (LUTa2) are used.

In a case where, in the calibration in which three test charts are printed, the second test chart is read but the third test chart is not read, old image forming conditions are used when the image is formed by using the third screen as illustrated in FIG. 10C.

As described above, even in the case where the CPU 401 receives the discontinuous instruction of the calibration, the image forming apparatus 1000 can form an image based on an appropriate combination of image forming conditions and a gradation correction condition. Thus, even in the case where calibration is discontinued, the image forming apparatus 1000 can prevent the density of an output image from being erroneously adjusted.

According to the exemplary embodiments of the disclosure, even in a case where calibration is discontinued, it is possible to prevent the density of an output image from being erroneously adjusted.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-129569, filed Jul. 30, 2020, which is hereby incorporated by reference herein in its entirety.

What is claimed is:

1. An image forming apparatus comprising:
an image processor configured to convert image data based on a conversion condition;
a printer configured to form an image on a sheet based on the converted image data;
a transfer member, onto which a pattern image formed by the printer is transferred;
a sensor configured to detect the pattern image formed on the transfer member;
a reader configured to convey a sheet having a test image thereon, and read the test image during conveying the sheet; and
a controller configured to perform calibration, in which the conversion condition is generated based on a result of reading the test image by the reader,
wherein, in a case where user instruction information for starting the calibration is received, the controller determines an image forming condition for controlling density of an image to be formed by the printer based on a result of detection by the sensor before the test image is formed, and
wherein, in a case where the sheet having the test image thereon jams in the reader during a period from when the image forming condition is determined based on the detection result of the sensor until the conversion condition is generated based on the result of reading the test image, the controller changes the image forming condition to a previous image forming condition before the pattern image is formed.

2. The image forming apparatus according to claim 1, wherein the image processor performs halftone processing on image data,
wherein the image processor converts the image data, on which the halftone processing is performed, based on a conversion condition corresponding to a type of the halftone processing,
wherein the controller causes the printer to form a first test image corresponding to first halftone processing, causes the transfer member to transfer the first test image onto a first sheet, and generates a first conversion condition based on a result of reading the first test image on the first sheet, and
wherein the controller causes the printer to form a second test image corresponding to second halftone processing, causes the transfer member to transfer the second test image onto a second sheet, and generates a second conversion condition based on a result of reading the second test image on the second sheet.

3. The image forming apparatus according to claim 1, wherein the printer includes a light scanner that exposes an photosensitive member with light to form an electrostatic latent on the photosensitive member, and a developing sleeve that develops the electrostatic latent image, and
wherein each of the image forming condition and the previous image forming condition is a power of light exposed by the light scanner.

4. The image forming apparatus according to claim 1, wherein the test image includes a first test image to be formed on a first sheet and a second test image to be formed on a second sheet, and wherein the controller causes the printer to form the second test image on the second sheet before the reader reads the first test image on the first sheet.

5. The image forming apparatus according to claim 4, wherein the controller causes the printer to form the first test image for a first type of an image object, and causes the printer to form the second test image for a second type of an image object different from the first type, wherein, in a case where the second sheet having the second test image thereon jams in the reader after the first test image on the first sheet is read by the reader, the controller determines the image forming condition for the first type based on a detection result of the pattern image by the sensor, and wherein, in a case where the second sheet having the second test image thereon jams in the reader after the first test image on the first sheet is read by the reader, the controller changes the image forming condition for the second type to the previous image forming condition before the pattern image is formed.

6. An image forming apparatus comprising:

an image processor configured to convert image data based on a conversion condition;

a printer configured to form an image on a sheet based on the converted image data;

a transfer member onto which a pattern image formed by the printer is transferred;

a sensor configured to detect the pattern image formed on the transfer member;

a reader configured to convey a sheet having a test image thereon, and read the test image during conveying the sheet; and a controller configured to perform calibration, in which the conversion condition is generated based on a result of reading the test image by the reader, wherein, in a case where the calibration is performed, the controller determines an image forming condition for controlling density of an image to be formed by the printer based on a result of detection by the sensor before the test image is formed, and wherein, in a case where a main power supply of the image forming apparatus is turned off during the period from when the image forming condition is determined based on the detection result of the detection result until the conversion condition is generated based on the reading result of the test image, the controller changes the image forming condition to a previous image forming condition before the pattern image is formed.

7. The image forming apparatus according to claim 6, wherein the printer includes a light scanner that exposes an photosensitive member with light to form an electrostatic latent on the photosensitive member, and a developing sleeve that develops the electrostatic latent image, and wherein each of the image forming condition and the previous image forming condition is a power of light exposed by the light scanner.

8. The image forming apparatus according to claim 6, wherein the test image includes a first test image to be formed on a first sheet and a second test image to be formed on a second sheet, and wherein the controller causes the printer to form the second test image on the second sheet before the reader reads the first test image on the first sheet.

9. The image forming apparatus according to claim 8, wherein the controller causes the printer to form the first test image for a first type of an image object, and causes the printer to form the second test image for a second type of an image object different from the first type, and wherein, in a case where the second sheet having the second test image thereon jams in the reader after the first test image on the first sheet is read by the reader, the controller determines the image forming condition for the first type based on a detection result of the pattern image by the sensor, and wherein, in a case where the second sheet having the second test image thereon jams in the reader after the first test image on the first sheet is read by the reader, the controller changes the image forming condition for the second type to a previous image forming condition before the pattern image is formed.

* * * * *